(12) United States Patent
Moore et al.

(10) Patent No.: US 9,176,488 B2
(45) Date of Patent: Nov. 3, 2015

(54) METHOD OF POSITIONING A CONTROL SURFACE TO REDUCE HYSTERESIS

(71) Applicant: ROLLS-ROYCE PLC, London (GB)

(72) Inventors: Jonathan Michael Moore, Bristol (GB); Simon Kenneth Haydn-Smith, Bristol (GB)

(73) Assignee: ROLLS-ROYCE PLC, London (GB)

( * ) Notice: Subject to any disclaimer, the term of this patent is extended or adjusted under 35 U.S.C. 154(b) by 500 days.

(21) Appl. No.: 13/666,324

(22) Filed: Nov. 1, 2012

(65) Prior Publication Data

US 2013/0142620 A1 Jun. 6, 2013

(30) Foreign Application Priority Data

Dec. 1, 2011 (GB) .................................. 1120664.6

(51) Int. Cl.
*F01D 17/20* (2006.01)
*G05B 15/02* (2006.01)
*F01D 17/24* (2006.01)
*F01D 17/08* (2006.01)
*F01D 17/16* (2006.01)
*F02C 9/20* (2006.01)
*F04D 27/00* (2006.01)

(52) U.S. Cl.
CPC .............. *G05B 15/02* (2013.01); *F01D 17/085* (2013.01); *F01D 17/162* (2013.01); *F01D 17/24* (2013.01); *F02C 9/20* (2013.01); *F04D 27/001* (2013.01); *F05D 2270/80* (2013.01); *G05B 2219/41208* (2013.01)

(58) Field of Classification Search
CPC ..... F01D 17/085; F01D 17/162; F01D 17/24; F05D 2270/361; F05D 2270/44; F05D 2270/60; F05D 2270/80; F05D 2270/303

USPC .................................. 415/160, 163, 164, 165
See application file for complete search history.

(56) References Cited

U.S. PATENT DOCUMENTS

| 4,631,657 A | 12/1986 | Hill et al. |
| 4,755,104 A | 7/1988 | Castro et al. |
| 5,117,625 A * | 6/1992 | McArthur et al. .............. 60/785 |
| 5,379,583 A | 1/1995 | Zickwolf, Jr. |
| 7,232,287 B2 * | 6/2007 | Regunath ...................... 415/160 |

(Continued)

FOREIGN PATENT DOCUMENTS

| EP | 1 988 258 A2 | 11/2008 |
| FR | 2 950 927 | 4/2011 |

(Continued)

OTHER PUBLICATIONS

Apr. 25, 2013 Search Report issued in European Patent Application No. EP 12 19 0935.
Mar. 8, 2012 British Search Report issued in British Application No. GB 1120664.6.

*Primary Examiner* — Ninh H Nguyen
(74) *Attorney, Agent, or Firm* — Oliff PLC

(57) ABSTRACT

A method of determining the actual position of a control surface (27). The method comprises receiving a signal (34) representative of a required position of the control surface (27), repositioning the control surface (27) in response to the signal (34) by moving an actuator (26), measuring a secondary position indicator, calculating the actual position of the control surface (27) on the basis of the secondary position indicator and, comparing the actual position with the required position.

10 Claims, 4 Drawing Sheets

(56) References Cited

U.S. PATENT DOCUMENTS

| | | |
|---|---|---|
| 7,927,067 B2 * | 4/2011 | Rajamani et al. ............. 415/118 |
| 8,770,912 B2 * | 7/2014 | Minto et al. ....................... 415/1 |
| 2007/0084211 A1 | 4/2007 | Bowman et al. |
| 2010/0185344 A1 | 7/2010 | Roach |

FOREIGN PATENT DOCUMENTS

| | | |
|---|---|---|
| GB | 1 541 363 A | 2/1979 |
| GB | 2 132 385 A | 7/1984 |
| WO | WO 2004/074681 A1 | 9/2004 |

* cited by examiner

METHOD OF POSITIONING A CONTROL SURFACE TO REDUCE HYSTERESIS

BACKGROUND OF THE INVENTION

The present invention relates to a method of positioning a control surface to correct for hysteresis, and a control system embodying the method.

Actuators can be used to move a control surface to a required position. The control surface could be a part of the actuator, or could be part of a separate component moved by the actuator. However, due to mechanical effects such as elastic deformation and backlash of the system, it can be difficult to determine the actual position of the control surface following movement, and it is therefore difficult to use an actuator to accurately move the control surface to the required position. One solution to this problem is to directly measure the position of the control surface using a position sensor. However, in some applications such as for example inlet guide vanes in gas turbine engines, there may be insufficient space to install such a sensor. It is therefore necessary to move the actuator a predetermined amount which corresponds to an amount that is predicted to be necessary to move the control surface to the required position.

The difference between a required position and an actual position of a control surface following movement of the actuator by the predetermined amount can depend on previous movements of the actuator. This can be a result of elastic deformation of the actuator and/or control surface and can also be a result of "backlash", i.e. play in the actuator. As a result, the actual position following movement by the predetermined amount will generally lag behind the required position, especially where the direction of movement is reversed. This effect is known in the art as "hysteresis".

As shown in FIG. 2, the magnitude of the difference between the required position and the actual position following movement by the predetermined amount varies as the actuator is moved. As shown in FIG. 2, the actual position lags behind the required position when the control surface is moved in both the opening and closing directions.

The present invention provides an improved system that addresses some or all of the aforementioned problems.

SUMMARY OF THE INVENTION

A method of determining the actual position of a control surface, the method comprising:
  receiving a signal representative of a required position of the control surface;
  repositioning the control surface in response to the signal by moving an actuator;
  measuring a secondary position indicator; and
  calculating the actual position of the control surface on the basis of the secondary position indicator and comparing the actual position with the required position.

It has been found that by measuring a secondary position indicator, the actual control surface position can be calculated and compared to the required position. The arrangement therefore provides a method of accurately determining whether a control surface has been repositioned correctly without directly measuring its position. The method therefore corrects for hysteresis effects by measurement of the secondary position indicator.

The secondary position indicator may comprise a force measurement. The force measurement may be a measurement of force imposed on the actuator during movement. By measuring a force imposed on the actuator during movement, the difference between the actual control surface position and the required control surface position can be calculated.

The actuator may comprise a motor for repositioning the control surface, and the force measurement may comprise a measurement of the load imposed on the motor.

Alternatively or in addition, the secondary position indicator may comprise a temperature measurement.

The actuation system may comprise a lubricated bearing configured to enable repositioning, and the temperature measurement may comprise a measurement of the temperature of at least one of the bearing and the bearing lubricant. By measuring the temperature of the lubricant, the viscosity of the lubricant, and therefore the load imposed on the motor can be calculated. The difference between the actual control surface position and the required control surface position can then be calculated from the load imposed on the motor.

The step of calculating the actual position may comprise comparing the secondary position indicator measurement with the corresponding actual control surface position in a look up table or graph.

Alternatively, the step of calculating the actual position may comprise calculating the actual position as a function of the secondary position indicator measurement.

The method further may compri
Mar. 8, 2012 British Search Report issued in British Application No. GB 1120664.6. se further repositioning the actuator subsequent to the comparison of the actual and required positions, such that the control surface is positioned closer to the required position.

According to a second aspect of the present invention there is provided a system for determining the actual position of a control surface, configured to carry out the steps of the first aspect of the invention.

According to a third aspect of the present invention there is provided a compressor comprising a system according to the second aspect of the invention.

According to a fourth aspect of the present invention there is provided a gas turbine engine comprising a compressor according to the third aspect of the invention

BRIEF DESCRIPTION OF THE DRAWINGS

The present invention will be more fully described by way of example with reference to the accompanying drawings, in which.

DETAILED DESCRIPTION OF THE PREFERRED EMBODIMENTS

Figure 1:
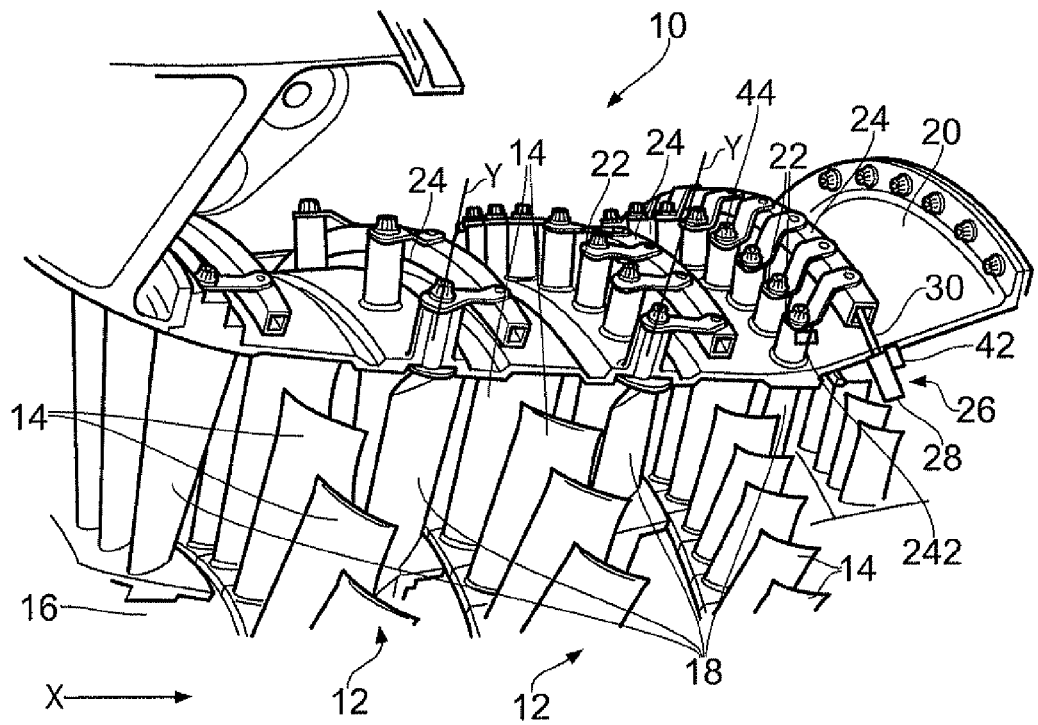
FIG. 1 is a perspective section view of part of a compressor comprising a plurality of variable inlet guide vanes.

FIG. 1 shows part of a compressor 10 of a gas turbine engine (not shown). As is well known in the art, the compressor 10 comprises a series of compressor stages 12, arranged in series along a principal axis X of the compressor 10. Each compressor stage 12 comprises a plurality of radially distributed compressor rotor blades 14. The rotor blades 14 are fixed to a disc 16, which is rotatable about the principal axis X. Each compressor stage 12 further comprises a plurality of radially distributed compressor stator blades 18. Each compressor stator blade 18 is mounted to an annularly outer compressor casing 20, such that the stator blades 18 are fixed relative to the casing 20.

Some or all of the stator blades 18 are pivotally mounted to the compressor casing 20 by a respective mounting 22, such that they can pivot about a respective radial axis Y to adjust the angle of attack of the respective blade 18 relative to the incoming air. Each mounting comprises a bearing 44, which can be lubricated by either a liquid lubricant in the form of a grease (not shown), or corresponding low friction surfaces (not shown).

Each respective mounting 22 is connected to a common unison ring 24 by a drag link 23. The unison ring 24 is rotatable about the principal axis X to thereby pivot all of the connected blades 18 of the respective compressor stage 12 to the same angle with respect to the upstream airflow.

The unison ring 22 can be rotated by an actuator 26. Although a single actuator 26 is shown in FIG. 1, it will be understood that a respective actuator 26 could be provided for each unison ring 24. The actuator 26 is in the form of a linear motor 28 mounted to the casing 20, and a push rod 30. A proximal end of the push rod 30 is slidably mounted to the linear motor 28, and a distal end is mounted to the respective unison ring 22. Movement of the actuator 26 thereby controls the position of a control surface 27 defined by the stator 18.

Figure 3:
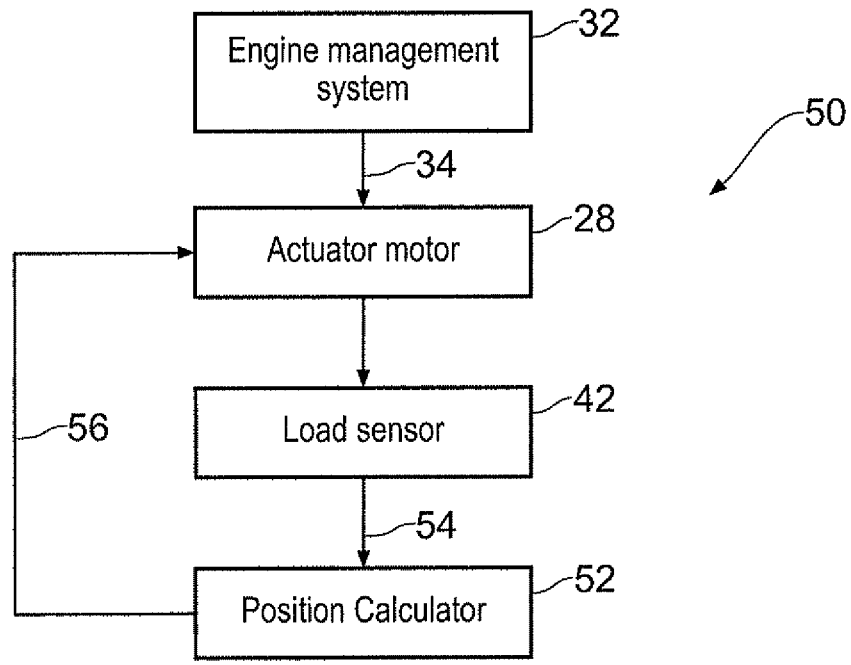
FIG. 3 is a flow diagram representing a first method of determining the actual position of the control surface of FIG. 1 in accordance with the invention.

The actuator 26 is controlled by a first actuator control system 50, shown diagrammatically in FIG. 3. The control system 50 comprises an engine management system 32, which is in signal communication with the motor 28, such that the motor 28 can receive a required position signal 34, representative of a required position 36 of the actuator 26. The control system 50 also comprises a sensor configured to measure a secondary position indicator. In this embodiment, the sensor comprises a load sensor 42, configured to measure a load imposed on the motor 28, i.e. the reaction forces on the motor 28 as the motor 28 is moved. The control system 50 further comprises a position calculator 52, which is in signal communication with the sensor 42 to receive a load measurement signal 54 therefrom. The position calculator 52 could comprise a programmable or fixed programme electronic device or look up table, which implicitly or explicitly stores the relationship between the secondary position indicator and the actual position of the control surface 27. For instance, if the calculator 52 is an electronic device the relationships are present in the coding of the device; if the calculator 52 is a look up table or graph, the relationships are implicit within the data stored in the table or graph.

Figure 8:
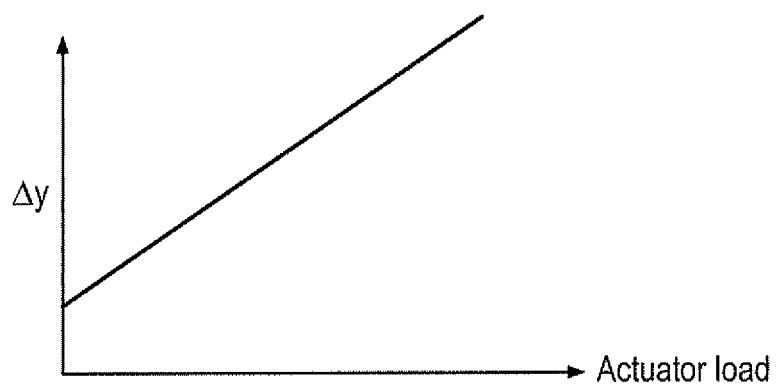
FIG. 8 is a graph showing a typical relationship between the difference between actual control surface position and required control surface position, and a secondary position indicator comprising a force measurement.

In experiments, the relationship between the load imposed on the motor 28 and the difference between the required position and the actual position of the control surface 27 has been found to be substantially linear. That is to say the relationship follows the general formula $\Delta y = ax + c$, where $\Delta y$ is the difference between the required position and the actual position of the control surface 27, x is the load imposed on the motor at a given instant, and a and c are constants. The value of the constants a and c will vary depending on the particular actuator used and whether or not the actuator is lubricated with grease for example. In general, the constant a has been found to be proportional to the elasticity of the actuator system and the friction generated by movement of the actuator, while the constant c is proportional to the backlash of the system. The constant c will generally be non-zero, i.e. at a zero load, there will still be some difference between the required position and the actual position of the control surface 27 due to backlash. A graph of this relationship is shown in FIG. 8.

The calculator 52 is in turn in signal communication with the motor 28, such that a position correction signal 56 can be received by the motor 28 from the calculator 52.

Figure 4:
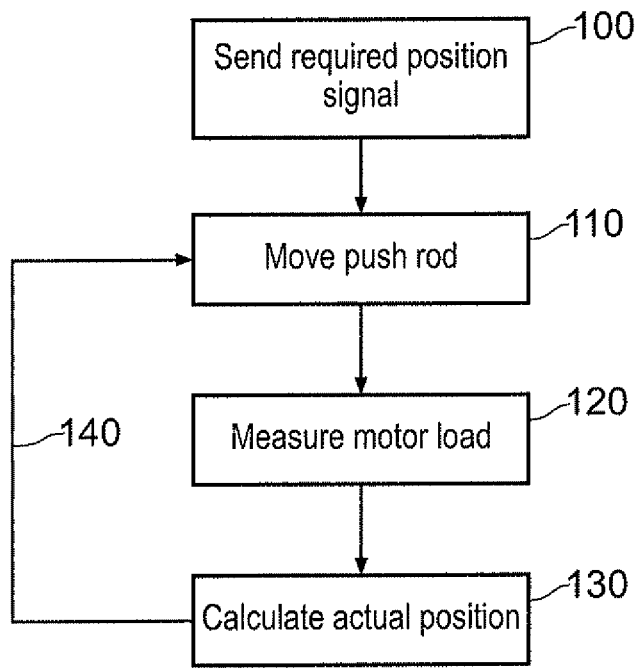
FIG. 4 a diagrammatic representation of the connections between the components of a first actuator system in accordance with the present invention.

In use, the actuator 26 is controlled by the control system 50 using the following method, as illustrated by the flow diagram shown in FIG. 4. In a first step 100, the engine management system 32 sends the required position signal 34 to the linear motor 28. The required position 36 is determined in accordance with engine conditions monitored by the engine management system 32, such as compressor disc 16 speed and throttle position, as is widely known in the art.

Figure 2:
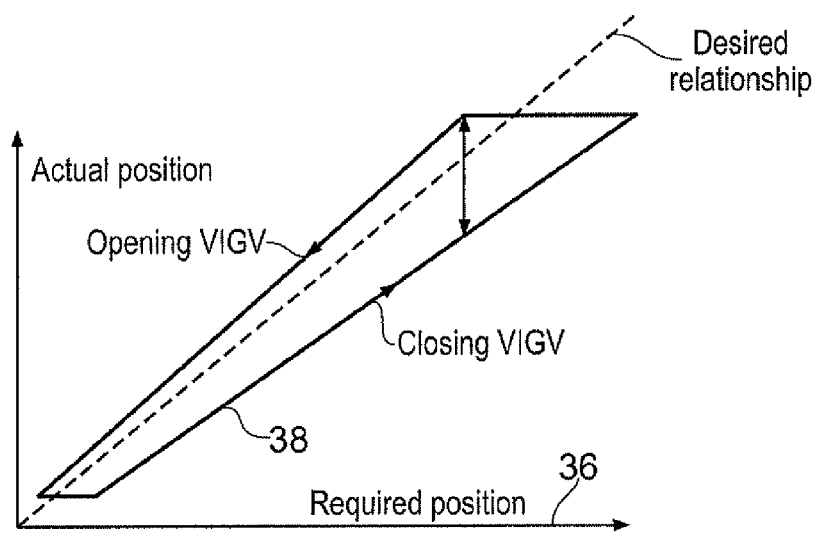
FIG. 2 is a graph showing a typical relationship between required control surface position and actual control surface position.

In response to the signal 34, the linear motor 28 moves the push rod 30 by a predetermined amount in a second step 110, and thereby moves the control surface to an actual position 38. Since the actual position 38 is not directly measured, the predetermined amount of movement of the motor 28 is determined in accordance with an expected, desired relationship, as shown in FIG. 2. However, due to a number of factors, including play in the connections between the motor 28 and the stator blades 18 (i.e. backlash), and elastic deformation of the components, the actual position 38 of the stator blades 18 following the movement provided by the motor 28 in response to the signal 34 does not correspond exactly to the required position 36, as shown in FIG. 2.

In a third step 120, the load imposed on the motor 28 is measured by load sensor 42, and the load signal 54 is generated and sent to the position calculator 52.

In a fourth step 130, the signal calculator 52 calculates the actual position of the control surface 27 on the basis of the stored relationship between the load imposed on the motor 28 and the actual position 38 and generates the correction signal 56, which is sent to the motor 28.

As a result of the correction signal 56 sent to the motor 28, In a fifth step 140, the motor 28 moves in response to the correction signal 56, and thereby moves the push rod, and in turn moves the actual position 38 of the control surface 27 closer to the required position 36.

Steps 120 to 140 may be repeated continuously during operation of the compressor, or until the difference between the actual position and required position $\Delta y$ is reduced to within an acceptable margin. Although steps 110 to 140 are described as separated steps, these may be carried out substantially simultaneously, or with a very short delay, to form a feedback loop.

Figure 5:
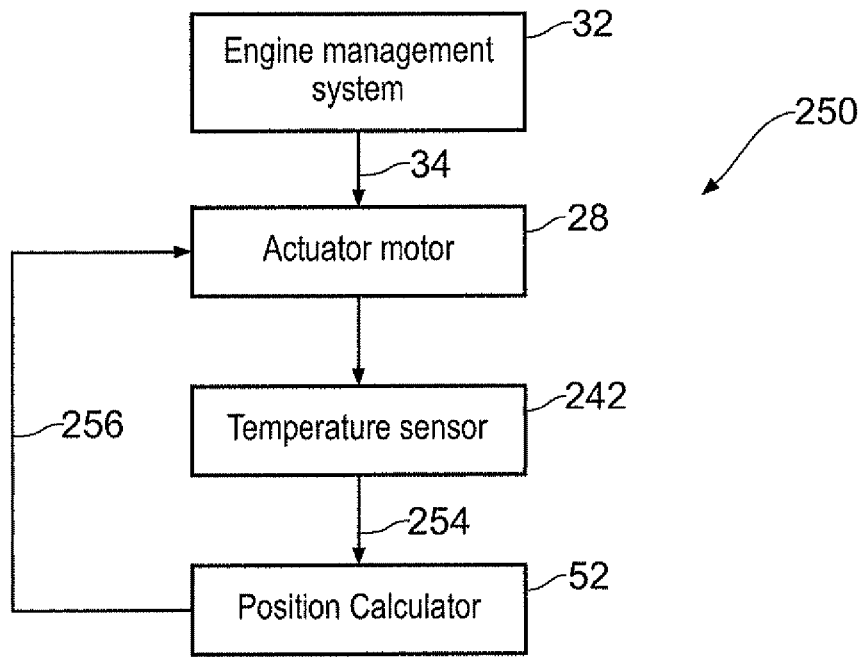
FIG. 5 is a flow diagram representing a second method of determining the actual position of the control surface of FIG. 1 in accordance with the invention.

FIG. 5 shows an alternative actuator control system 250. The actuator control system 250 is similar to the control system 50, and similar features are given the same reference numerals, incremented by 200.

The control system 250 also comprises a sensor configured to measure a secondary position indicator. However, in this embodiment, the sensor comprises a temperature sensor 242, configured to measure a temperature of one or more stator bearings 44, and/or the lubricant, and provide a temperature measurement signal 254 to a position calculator 252. Again, the calculator 52 is in turn in signal communication with the motor 28, such that a position correction signal 256 can be received by the motor 28 from the calculator 52.

The temperature sensor 242 is preferably located close to a bearing 44, or within the grease so that a direct temperature measurement can be obtained. Such a measurement has been found to be an accurate means of determining the amount of hysteresis in the control surface 27 (i.e. the difference between the desired position and the actual position Δy). This is because lubricant viscosity is highly dependent on temperature, and so the resistance to movement applied by the lubricant, and therefore the load imposed on the motor 28 is also highly dependent on temperature. It has been found that lubricant viscosity increases as temperature is reduced.

Figure 7:
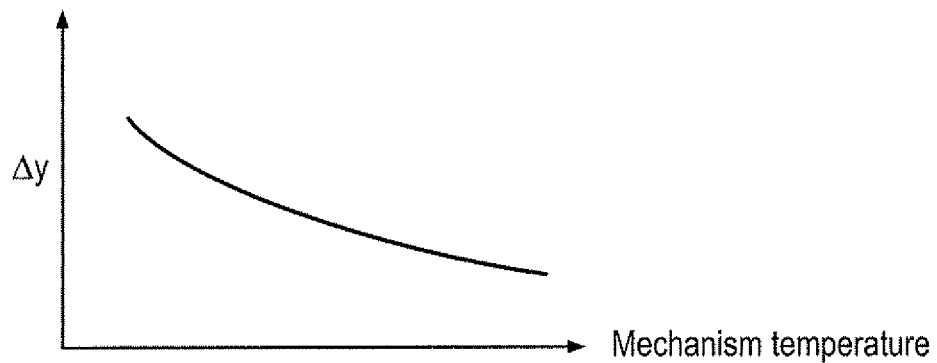
FIG. 7 is a graph showing a typical relationship between the difference between actual control surface position and required control surface position, and a secondary position indicator comprising a temperature measurement.

In experiments, the relationship between the temperature of the lubricant and the difference between the required position and the actual position of the control surface 27 has been found to be substantially exponential. That is to say the relationship follows the general formula $\Delta y = a^{1/x} + c$, where Δy is the difference between the required position and the actual position of the control surface 27, x is the absolute temperature in Kelvin of the lubricant at a given instant, and a and c are constants. Again, the value of the constants a and c will vary depending on the particular actuator and lubricants used. A graph of this relationship is shown in FIG. 7.

Figure 6:
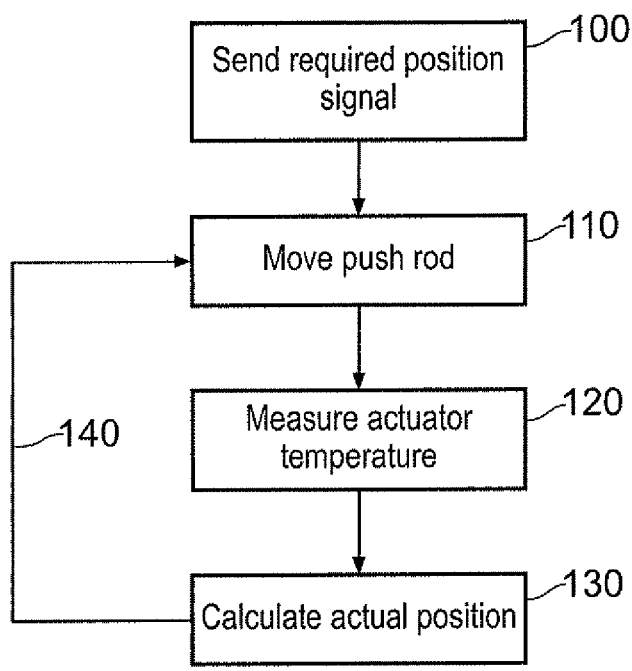
FIG. 6 a diagrammatic representation of the connections between the components of a second actuator system in accordance with the present invention.

FIG. 6 shows the method of determining the actual control surface position 38 using the control system 250. As shown, the method shown in FIG. 6 is substantially identical to the method employed using control system 50, except the secondary position indicator comprises a temperature measurement.

The described control system and method therefore provides a method of determining the actual position of a control surface relative to a required position, and thereby allowing a reduction of hysteresis of the position of a control surface, without directly measuring the actuator position. The control system is therefore lighter, cheaper, and less complex than previous systems, and can provide high accuracy control of control surface positions, particularly in situations where space around the control surface is constrained. Also, by compensating for lubrication temperature, the accuracy and operating temperature range of the actuation system can be increased.

While the invention has been described in conjunction with the examples described above, many equivalent modifications and variations will be apparent to those skilled in the art when given this disclosure. Accordingly, the examples of the invention set forth above are considered to be illustrative and not limiting. Various changes to the described embodiment may be made without departing from the spirit and scope of the invention.

For example, while control systems in which the secondary position measurement comprises either component temperature or motor load measurements have been described as separate embodiments, the control system could comprise sensors for measuring both of these measurements, and the actual position calculator could take into account both of these measurements in determining the actual actuator position.

Where a temperature sensor is employed, this could be located at substantially any suitable location. However, it has been found that adjacent the bearing, within the grease, and locations which experience high loads provide measurements which can be most closely correlated with Δy.

Furthermore, the calculation may also take into account required control surface position when calculating Δy, as Δy may be dependent on control surface position. The described actuator control system of method of determining actual actuator position could be applied to substantially any actuator. The invention is particularly suited to situations where cost or space constraints preclude direct measurement of actual control surface position, or where the actuation system must operate accurately over a wide range of operating temperatures. Suitable examples include variable area nozzle actuators in gas turbine engines, aircraft control surface actuators, and ship rudder actuators.

The invention claimed is:

1. A method of determining an actual position of a control surface, the method comprising:
   receiving a signal indicating a required position of the control surface;
   repositioning the control surface in response to the signal by moving an actuator;
   measuring a secondary position indicator including providing a force measurement;
   calculating the actual position of the control surface based on the secondary position indicator;
   comparing the calculated actual position with the required position; and
   outputting the compared actual position.

2. The method according to claim 1, wherein
   the actuator includes a motor configured to reposition the control surface, and
   the force measurement includes a measurement of the load imposed on the motor.

3. The method according to claim 1, wherein the step of calculating the actual position includes comparing the secondary position indicator measurement with the corresponding actual position in a look up table or graph.

4. The method according to claim 1, wherein the step of calculating the actual position includes calculating the actual position as a function of the secondary position indicator measurement.

5. The method according to claim 1, further comprising:
   repositioning the actuator subsequent to the comparison of the actual and required positions such that the control surface is positioned closer to the required position.

6. A system for determining the actual position of a control surface configured to perform the steps of claim 1.

7. A compressor for a gas turbine engine comprising a system according to claim 6.

8. A gas turbine engine comprising a compressor according to claim 7.

9. A method of determining an actual position of a control surface, the method comprising:
   receiving a signal indicating a required position of the control surface;
   repositioning the control surface in response to the signal by moving an actuator;
   measuring a secondary position indicator including providing a temperature measurement;
   calculating the actual position of the control surface based on the secondary position indicator;
   comparing the calculated actual position with the required position; and
   outputting the compared actual position.

10. The method according to claim 9, wherein
    the actuation system includes a lubricated bearing configured to enable repositioning, and
    the temperature measurement includes a measurement of the temperature of at least one of the bearing and the bearing lubricant.

* * * * *